July 29, 1930.  F. S. CARVER  1,771,526
FILTER AND FLUID EDUCTION MEANS FOR PRESSES
Filed Dec. 26, 1923   2 Sheets-Sheet 1
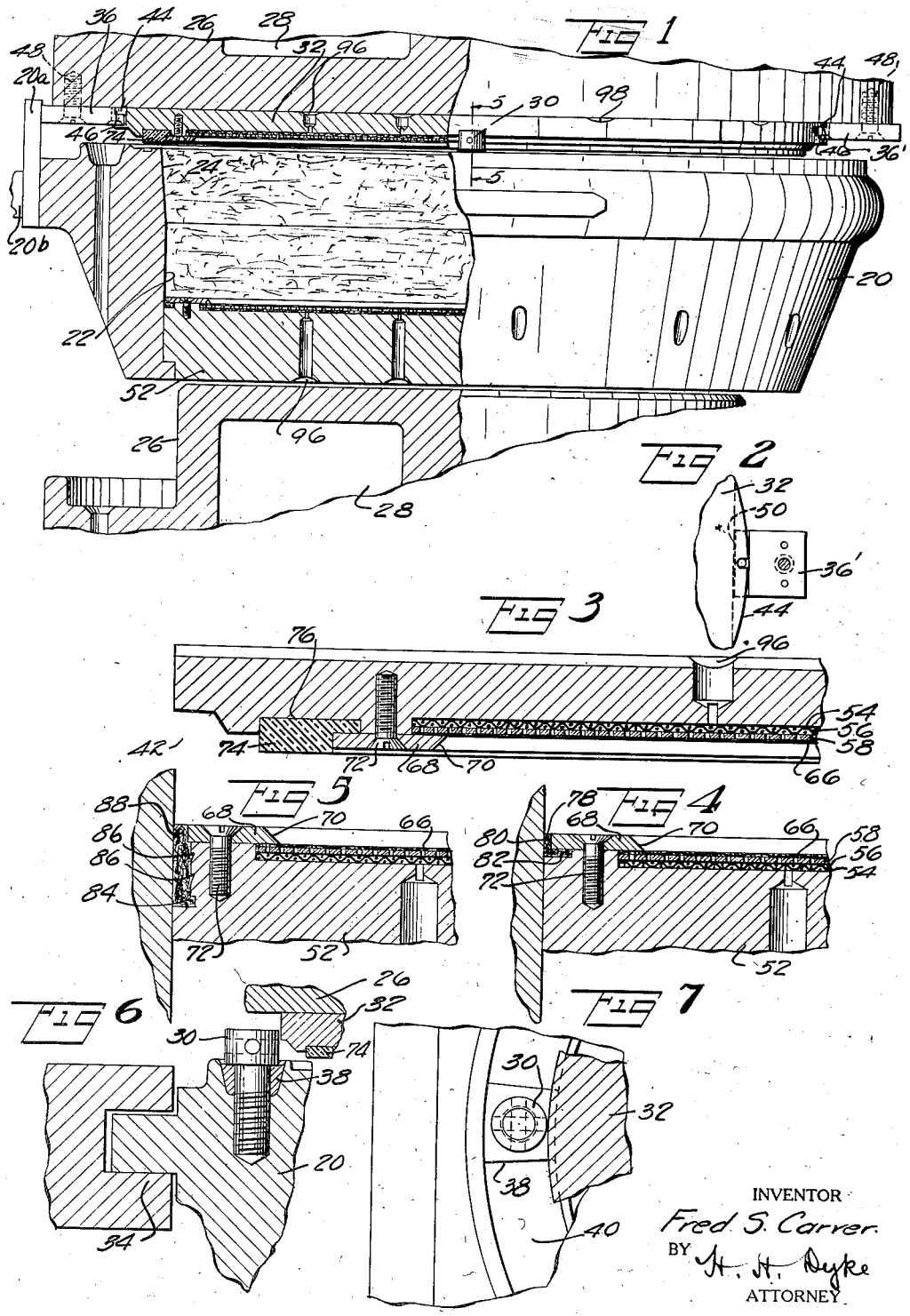
INVENTOR
Fred S. Carver.
BY H. H. Dyke
ATTORNEY July 29, 1930.  F. S. CARVER  1,771,526
FILTER AND FLUID EDUCTION MEANS FOR PRESSES
Filed Dec. 26, 1923   2 Sheets-Sheet 2
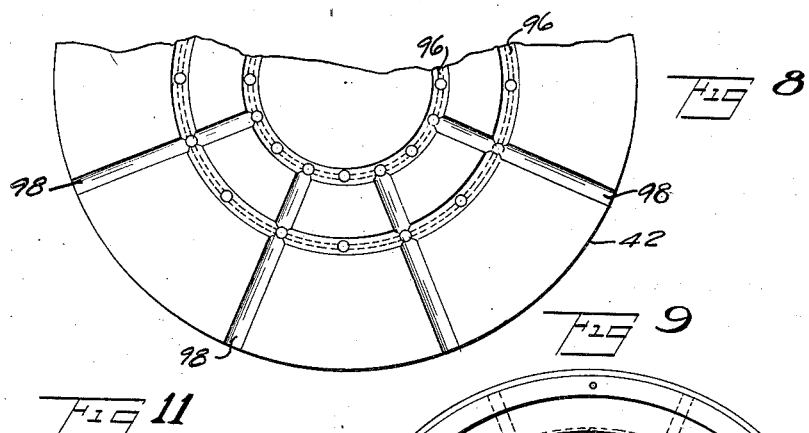
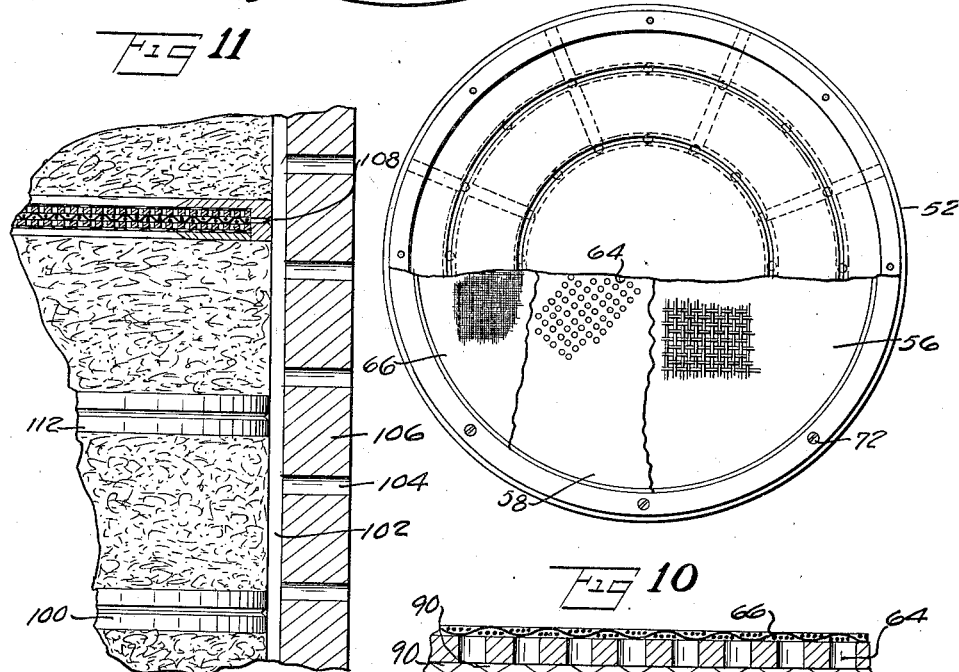
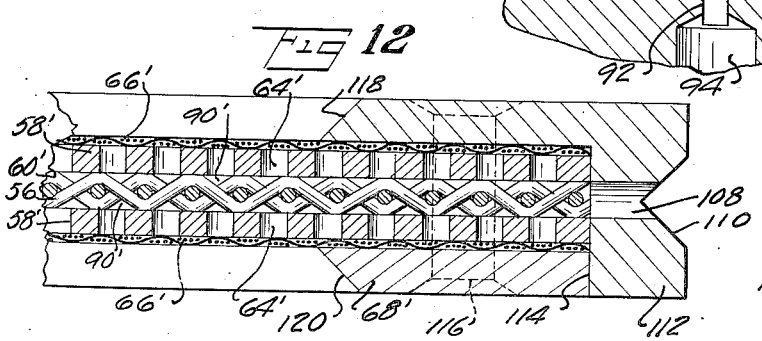
INVENTOR
Fred S. Carver.
BY
ATTORNEY Patented July 29, 1930

1,771,526

UNITED STATES PATENT OFFICE

FRED S. CARVER, OF EAST ORANGE, NEW JERSEY

FILTER AND FLUID-EDUCTION MEANS FOR PRESSES

Application filed December 26, 1923. Serial No. 682,823.

My invention relates to an improved filter and fluid eduction means for presses, such as pot presses, cage presses, box presses and the like, operated at high pressures, which may be as high as 5000–6000 pounds per square inch, and has for its object to provide filter and fluid eduction means, such as pressure plates, separator plates and the like, which are complete in themselves, and completely eliminate the necessity for the filter pads of camel's hair and the like heretofore used.

In accordance with the present invention I make use of a substantially incompressible metallic filtering medium of very fine wire cloth backed up by a plate of sheet metal provided with numerous small closely spaced holes, which is in turn backed up by a sheet of coarse wire mesh. In this way an extremely firm and substantial plate structure is obtained well adapted to stand up under the enormous pressures to which they are subjected in use, and which provides extensive fluid eduction channels and secures extremely efficient results in the separation of fluids from solids by pressure filtration through the incompressible wire cloth, which is quite thin and presents numerous minute passages for fluid therebetween, which passages are substantially not reduced in area by the application of pressure. A number of advantages are secured as compared with the practice heretofore followed making use of pads of camel's hair and the like compressible fibrous materials. Such pads are expensive, and their replacement and upkeep involves heavy expense. In order to stand up at all well in use they must be made comparatively thick and being made of compressible fibrous material they present enormous resistance to fluid passage when subjected to high pressure, the tendency resultant upon increase of pressure being in the direction of closing the passages therethrough, so that increase of pressure does not result with such pads of camel's hair and the like in corresponding increase in flow of expressed fluid. When the thin wire filter cloth is made use of with proper support and ample provision for withdrawal of expressed fluid passing therethrough, there is no such tendency towards closing of the minute passages as the pressure is increased, and high pressure efficiency can be secured.

The invention is applicable to presses of various sorts, as, for example, to hydraulic presses of the pot or cage types used for expressing fluids from materials, such, for example, as ground cocoa beans, copra meal and the like.

In the accompanying drawings, I have shown my invention as applied to a pot press and also its application to separators for cage presses. In said drawings, Fig. 1 is a part sectional view of a press pot and press platens of a pot press having filter and fluid eduction plates in accordance with my invention. Fig. 2 is a detail plan view of a plate supporting block. Fig. 3 is is an enlarged sectional view of the top filter and fluid eduction plate of Fig. 1. Fig. 4 is an enlarged section of the lower or pot bottom filter and fluid eduction plate of Fig. 1. Fig. 5 is a view similar to Fig. 4, but showing a modified form of packing ring. Fig. 6 is an enlarged section on line 6—6, Fig. 1 and showing means for positioning the press pot with respect to the press platen. Fig. 7 is a plan view of the parts shown in Fig. 6. Fig. 8 is a fragmentary plan view showing the back of the top filter plate shown in Fig. 3. Fig. 9 is a face plan view of the bottom filter and fluid eduction plate or pot bottom shown in Figs. 1 and 4, with parts broken away to show the interior construction. Fig. 10 is a fragmentary section on a greatly enlarged scale of the pressure plates of Fig. 1. Figs. 11 and 12 show the application of the invention to a cage press. Fig. 11 is a fragmentary section of a cage press provided with separator plates embodying my invention, and Fig. 12 is an enlarged section of one of the separator filter and fluid eduction plates of Fig. 11.

Referring first to the showing of Figs. 1–10 illustrating the application of the invention to a pot press, the pot 20 may be of any form, but preferably has the otherwise cylindrical bore 22 enlarged on a taper at 24 near its upper end or mouth, in accordance with my U. S. Patent No. 1,247,078 of Nov. 20, 1917.

Pressure is applied, as by a hydraulic ram, through the press platens 26, 26, which may be provided with chambers 28, 28 for supply of steam or other press heating fluid.

In pot presses as customarily constructed making use of a filter pad of camel's hair or the like, which extends over the edge of the press pot and affords a seal between it and the platen, there is no special requirement for any nice or close positioning of the press pot with respect to the press platens and pressure plates carried thereby. As, however, the pad of camel's hair or the like is dispensed with in accordance with the present invention and the filter means are provided in the press plate itself, it becomes desirable to make provision for securing accurate registration and positioning of the pot with respect to the plate above it. In the construction shown such registration is secured by providing the pot 20 with studs 30 on each side thereof. Short washers or blocks 38 may be fitted into the gutters 40 and the studs 30 passed therethrough and screwed into the pot 20, as shown in Figs. 6 and 7. These studs 30 extend upwardly to engage the edges of the upper filter and pressure plate 32 and coming into contact with the rounded sides of plate 32 serve to guide the pot into correct position with respect to the press plate 32 as the pot is slid in between the press platens on its slideways 34. For correctly positioning the pot in the direction of its travel, that is to say, at right angles to the direction just under discussion, a stop piece 20ª secured to the pot handle 20ᵇ is made to engage the block 36 secured to the upper press platen 26. The pot being thus guided laterally by studs 30 and stopped longitudinally by holding block 36 is accurately positioned in both directions with respect to the upper press platen 26 and the upper filter, pressure and fluid eduction plate 32.

The holding block 36 may be duplicated at 36' on the opposite side of the platen 26, and such blocks are preferably utilized for supporting the plate 32 from the platen 26. In the form shown plate 32, which in general has a tapered outer lower edge as shown at 42, is machined off to present fins 44, 44, which are received in the notches 46, 46 provided in the blocks 36, 36'. The parts are positioned by having a stud 48 in the holding blocks 36, 36', engage notch 50 in the edge of plate 32, as shown in Fig. 2. Blocks 36, 36' are secured to platen 26 in any desired way, screw fastenings being shown.

The lower filter, pressure and fluid eduction plate 52 forms the slidable bottom of pot 20. The same filtering and fluid eduction means are used in both bottom and top plates 32, 52 and are constructed as follows: The plates are provided on their inner sides with the recess 54. Said recess receives two disks, a reticulated backing disk 56 and a plate or sheet 58 of foraminous sheet metal. The reticulated disk 56 is preferably of coarse wire mesh and same is preferably flattened so as not to give or yield under the enormous pressure used in pressing, as by being passed through pressure rolls or the like, so as to present a series of closely spaced flats 60, which are seated respectively against the bottom wall 62 of recess 54 and the back of plate 58. The flattened mesh disk 56 serves two purposes in that it affords numerous channels for lateral flow of expressed fluid and it also supplies extensive and closely spaced supports at the flattened regions 60 for the perforated sheet metal plate 58, which is so substantially supported that it has practically no give or yield under the extremely high pressures applied thereto in pressing operations. The sheet metal plate 58 is preferably of steel and has very numerous holes 64 for fluid passage preferably punched therein. Where the term "foraminous" is applied to the plate 58, it is intended thereby to characterize same as being substantially filled with small closely spaced holes. This arrangement of a foraminated plate backed by heavy wire mesh is claimed per se in my copending application Serial No. 682,822, filed on even date herewith, as a support for the customary camel's hair filter pad.

Over the foraminated sheet 58 and supported thereby against the high pressure encountered is a surface sheet of very finely woven wire filter cloth 66. In the showing of Fig. 9, such wire cloth 66 is shown as having four closely lying wires in each of its woven strands, but closely woven wire filter cloth of a variety of weaves now quite commonly used in the conventional types of filter presses worked under relatively low pressures, may be made use of. The varieties known as the "Dutch weave" and the rolled Monel metal filter cloth are well adapted for such purpose. Such metallic filter cloths have sufficient strength when used in conjunction with a flat sheet metal plate filled with very fine holes to bridge over the small holes substantially without indentation thereinto even when subjected to pressures of the order of 5,000 lbs. to the square inch. These three layers, the flattened wire mesh backing 56, the foraminated sheet metal plate 58, and the wire filter cloth 66 are secured in place by a flat ring 68, preferably tapered or chamfered off on its inner side as shown at 70 to facilitate press cake removal, and held in place in any desired way, as by screws 72. In pressing, the wire filter cloth 66 comes into direct contact with the material being pressed, the fluid passing readily through the fine passages in the wire filter cloth, as between parallel strands thereof, the solid material being held back. The fluid passages in the wire filter cloth are practically self-cleaning and there is substantially no choking up of such passages under high pressure, as will take place with compressible filter pads of camel's hair, for example. After passing through the wire filter cloth the fluids pass readily back through the highly numerous holes in the sheet metal plate 58 and laterally to suitable outlets through the lateral passages in the wire mesh disk 56.

In the case of the top plate 32 there is provided a flat packing ring 74 seated in an annular recess 76 and also held in place by the ring 68, as shown in Fig. 2. This packing ring 74 is of slightly compressible material, such as fibre, and projecting slightly beyond the face of holding ring 70 serves to secure a tight seal between top plate 32 and the upper edge or top of pot 20, and to effectively prevent leakage of the fluid pot contents under the high pressure. Under the prior practice the edges of the camel's hair pads were relied on to prevent leakage at this point, but in making use of the wire filter cloth it becomes necessary to make separate provision therefor, as the packing ring 74.

In the case of the bottom plate, which fits and slides in bore 22 of pot 20, the packing ring 78 is preferably of material such as felt, leather or the like, and is preferably of angular section, as shown in Fig. 3, comprising the vertical packing portion 80 and the inwardly extending portion 82 by which the packing ring 78 is clamped under the holding ring 68. Other types of packing rings may be made use of in connection with the pot bottom plate 52 and in Fig. 4 I have shown the edge of the plate or pot bottom 52 provided with an edge or corner recess 84, which comprises the serrated grooves 86, 86, and receives the packing ring 88 of felt or the like material, which may be firmly seated in place by entering the serrated grooves 86, and still other forms of packing rings may be used.

Fluid which passes through the filter cloth 66, goes through the holes 64 in the foraminated plate 58 and traverses the laterally extending channels 90, 90 in the reticulated mesh material 60. In the form shown the back wall or recess bottom 62 of the respective plates 32, 52 are provided with narrow annular grooves 92 and these communicate through the drilled holes 94 with the concentric grooves 96, 96 formed in the back of the plate, and said grooves 96, 96 are intersected by the radial grooves 98, 98 which serve as fluid eduction passages to the margin of the plate, whence the expressed fluid runs out through the gutters provided therefor in the pots 20 and press platens 26. The grooves 92 in the back wall 62 are made relatively narrow so that same may be effectively bridged over by the superincumbent layers consisting of wire mesh, metal plate and filter cloth preventing indentation thereinto under the very high pressures.

In the cage press of Figs. 11 and 12 I have shown separator plates 100 embodying the present invention. The separator plates 100 serve as filter plates and for carrying the expressed fluid laterally to the outlet channels 102 and 104 formed in the wall 106 of the cage press. For this purpose I preferably make use of a double sided plate comprising two outer layers of wire filter cloth, 66′, 66″, a pair of foraminated sheet metal plates 58′, 58′ and a single disk of flattened wire mesh 60′. The fluid expressed by pressure through the two layers of filter cloth 66′, 66′ passes through the small closely spaced opening 64′ in the foraminated plates 58′, 58′ and passes out laterally through the tortuous passages 90′, 90′, provided within the reticulated mesh material 60′ and through the annular passage 108 to the outlet groove 110, from whence it passes to the outlet passages 102 and 104 of the cage press wall.

In constructing such separator plates, I preferably provide an angle ring 112 having a recess 114 therein, and a holding ring 68″, which with the five interposed layers already referred to are secured to the ring 112 as by means of rivets or other fastening means 116. The ring 112 and the holding ring 68′ are each preferably tapered on the inner edges thereof as shown at 118, 120.

In making use of the pressure filter and fluid eduction plates and separator plates of the present invention the use of separate filter pads of camel's hair or the like is dispensed with and their troublesome handling and upkeep eliminated and, in the case of the pot press, the operation consists merely in filling the pots with the material such as ground cocoa beans, copra meal or the like to be subjected to pressure and applying pressure thereto and after the pressing operation is completed and the pots withdrawn, the resulting press cake is directly removed without any pads or other filtering devices adhering thereto and the pot is immediately ready for receiving further material to be pressed. In the case of the cage press the cage is charged with suitable quantities of the material to be pressed and the separator plates are placed therein between successive portions of the charge and pressure applied, and after the pressure has been applied and the resulting caked material is ready to be removed, it is taken out in separated layers and the separator plates set aside for reuse with no occasion for stripping camel's hair pads or the like from the cake produced.

While I have illustrated the application of the invention to pot presses and cage presses only, it will be apparent that it may be applied to other types of presses, such as the well known box and plate presses, for example. It is to be understood that the apparatus shown is for the purpose of illustration only and for affording an understanding of the invention, and that same is not limited to the precise showing made, but may be made use of in various other connections and that modifications and changes may be resorted to within the scope of my claims by which the invention is defined.

I claim:

1. In a filter-hydraulic press, the combination of a metallic filter cloth, a foraminated sheet metal plate, and a backing of coarse, wire mesh fabric in the order named, the filter cloth being of sufficient strength and the openings in the metal plate being sufficiently small so that the filter cloth can bridge the openings in the metal plate without being substantially indented thereinto under pressure of the order of several thousand pounds per square inch.

2. In a press, the combination of a woven metallic filter cloth, a foraminated metal sheet, a flattened out coarse wire mesh fabric and a backing plate provided with fluid outlet passages opening toward the wire mesh arranged in the order named, the openings in said elements being successively bridged by the adjacent element.

3. In a press, the combination of a woven metallic filter cloth, a foraminated sheet metal plate, a backing of coarse wire mesh fibric flattened out at the wire crossings, and means for securing same together in the order named.

4. In a press, a recessed pressure plate provided with fluid outlet passages communicating with the recess, a foraminated metal sheet, and a backing of coarse wire mesh material flattened at the wire crossings in said recess, the latter at the rear, and a covering of woven wire filter cloth over said foraminated metal sheet and said wire filter cloth, foraminated metal sheet and coarse wire mesh substantially filling said recess.

5. In a press, a pressure plate having a recess therein and having fluid outlet openings communicating with said recess, a foraminated sheet metal plate in said recess, a backing behind said plate in said recess of coarse wire mesh material of original thickness in excess of the depth of the space provided therefor in the recess but flattened at the wire crossings, so that it and the foraminated plate together with the metallic filter cloth hereinafter referred to occupy the recess with the surface of the filter cloth substantially flush with the edges of the recess, a covering of metallic filter cloth over the front of the foraminated plate, and a ring for securing the parts together.

6. A pressure plate member for pot presses and adapted to be used under very high pressures, comprising a recessed plate having narrow outlet channels in the back thereof, a disk of coarse wire mesh material in said recess and in contact with the back wall thereof, a disk of sheet metal closely filled with small perforations in said recess and seated against the wire mesh material, a surface layer of fine wire filter cloth over the sheet metal disk, and an annular holding ring secured to the recessed plate and holding said wire filter cloth, foraminated sheet metal disk, and coarse wire mesh in place in said recess.

In testimony whereof, I have signed my name hereto.

FRED S. CARVER.